R. F. CHATILLON.
BALANCE.
APPLICATION FILED MAY 17, 1911.

1,017,137.

Patented Feb. 13, 1912.

WITNESSES

INVENTOR
RALPH F. CHATILLON
BY
ATTORNEYS

COLUMBIA PLANOGRAPH CO., WASHINGTON, D.

UNITED STATES PATENT OFFICE.

RALPH F. CHATILLON, OF NEW YORK, N. Y.

BALANCE.

1,017,137. Specification of Letters Patent. Patented Feb. 13, 1912.

Application filed May 17, 1911. Serial No. 627,836.

*To all whom it may concern:*

Be it known that I, RALPH F. CHATILLON, a citizen of the United States, and a resident of the borough of Manhattan, city, county, and State of New York, have invented certain new and useful Improvements in Balances, of which the following is a specification.

My invention relates to balances and more particularly to spring balances commonly known as pocket or sportsmen's balances, and has for its object to improve the connection between the usual spring and the balance parts.

My invention will be fully described hereinafter and the features of novelty will be pointed out in the appended claim.

Reference is to be had to the accompanying drawings in which—

Figure 1:
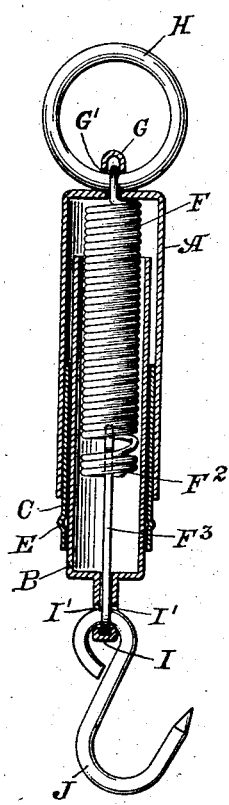
Figure 2:
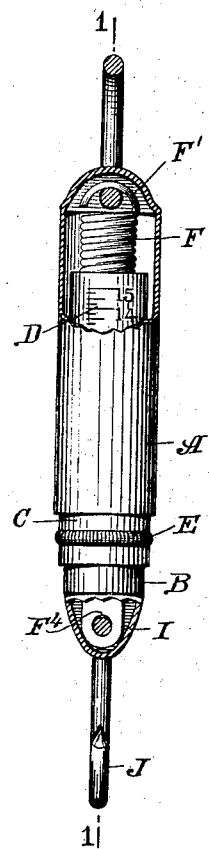

Figure 1 is a longitudinal section of my improved scale on the line 1—1 of Fig. 2 and Fig. 2 is an elevation thereof partly in section looking at right angles to Fig. 1.

The balance comprises the usual telescopic and relatively movable outer and inner tubes A and B, and the sleeve C, slidably mounted in the outer tube A, and adapted to be adjusted in the customary manner so as to have its lower end always in registry with the zero point of the usual scale D. An annular bead or other projection E is formed on the sleeve C, and serves to limit its inward movement relatively to the tube A. The scale D is produced on the inner tube B, and is graduated to indicate in pounds and fractions thereof the resistance of the lengthwise extending spring F, as the said inner tube is withdrawn to a greater or less extent as the balance is used. The outer tube A is formed with an axially extending recessed extension G into the recess of which the one-hooked end F' of the spring F extends. A ring or other suspending member H extends through openings G' in the extension G, and is connected with the end F' of the spring F, the said end F' in the specific illustration hooking over or through said ring H. The opposite end F² of the spring F in the specific form of my invention shown in the drawings is connected with a bar F³, the free end of which extends into the recess of an axially extending recessed extension I forming part of the inner tube B. This bar F³ is provided with an aperture F⁴ which registers with openings I' of the extension I for the accommodation of a hook or other suspended member J, which as shown, passes through said openings F⁴ and I' so as to be connected with the bar F, and also with the extension I.

In my invention both the suspending member H and the suspended member J are positively connected not only with the spring F but also with the respective tubes A and B. It is thus impossible for the spring F to have a sliding or slipping movement relatively to either tube A or B, and a balance of extreme accuracy is secured. Furthermore, a balance embodying my invention is easily and cheaply constructed and the danger of the disarrangement of the parts and consequent unreliability is entirely obviated.

Various changes in the specific form shown and described may be made within the scope of the claim without departing from the spirit of my invention.

I claim:

In a balance, a casing comprising two telescopic tubes each provided with a recessed extension and movable relatively to each other, resilient means in said tubes having one end located in each recessed extension, a suspending member connected with one end of said resilient means and passing through the recessed extension of one tube and a suspended member connected with the other end of said resilient means and passing through the recessed extension of the other tube.

In testimony whereof, I have hereunto set my hand and seal in the presence of two subscribing witnesses.

RALPH F. CHATILLON.

Witnesses:
GEO. SCHIER,
JOHN A. KEHLENBECK.

---

Copies of this patent may be obtained for five cents each, by addressing the "Commissioner of Patents, Washington, D. C."